United States Patent [19]

Hisgen et al.

[11] Patent Number: 4,728,714
[45] Date of Patent: Mar. 1, 1988

[54] WHOLLY AROMATIC MESOMORPHIC POLYESTER IMIDES, THE PREPARATION AND USE THEREOF

[75] Inventors: Bernd Hisgen, Limburgerhof; Hans-Jakob Kock, Ludwigshafen, both of Fed. Rep. of Germany

[73] Assignee: BASF Aktiengesellschaft, Ludwigshafen, Fed. Rep. of Germany

[21] Appl. No.: 937,719

[22] Filed: Dec. 4, 1986

[51] Int. Cl.[4] .................. C08G 63/54; C08G 69/44
[52] U.S. Cl. .................................. 528/183; 528/184; 528/190; 528/193; 528/194; 528/210; 528/220
[58] Field of Search ........ 528/183, 184, 190, 193–194, 528/210, 220

[56] References Cited

U.S. PATENT DOCUMENTS

| | | | |
|---|---|---|---|
| 4,118,372 | 10/1978 | Schaefgen | 528/190 |
| 4,176,223 | 11/1979 | Irwin | 528/170 |
| 4,351,918 | 9/1982 | Charbonneau et al. | 524/602 |
| 4,375,530 | 3/1983 | Hay et al. | 524/605 |
| 4,383,105 | 5/1983 | Irwin | 528/170 |
| 4,398,019 | 8/1983 | Cox et al. | 528/183 |
| 4,414,381 | 11/1983 | Griffin et al. | 528/190 |
| 4,499,256 | 2/1985 | Blundell et al. | 528/172 |
| 4,564,669 | 1/1986 | Dicke et al. | 528/173 |
| 4,623,732 | 11/1986 | Peters | 548/480 |
| 4,632,798 | 12/1986 | Eickman et al. | 528/183 X |

*Primary Examiner*—Lucille M. Phynes
*Attorney, Agent, or Firm*—Keil & Weinkauf

[57] ABSTRACT

Wholly aromatic mesomorphic polyester imides which form a liquid-crystalline fiber-forming melt below 320° C. and are composed of (a) from 5 to 35 mol % of repeat units of the formulae I and/or II

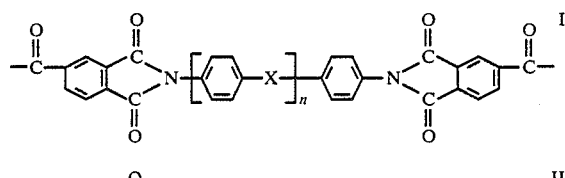

I

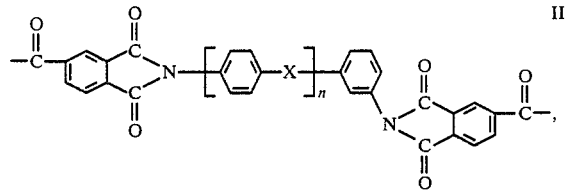

II where x can be identical or different and each is —O—, —S—, —SO$_2$—, —CO—, —CH$_2$— or =C(CH$_3$)$_2$, and n is 1 or 2, (b) from 0 to 30 mol % of repeat units of the formulae III and/or IV

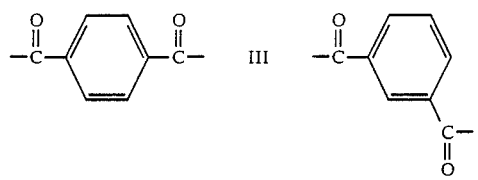

III (c) a molar amount corresponding to the total amount of components (a) and (b) of repeat units
(c1) from 3 to 35 mol % of units of the formula V

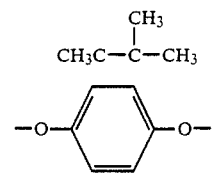

and one or more of the repeat units.
(c2) from 2 to 25 mol % of units of the formula VI

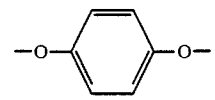

(c3) from 0 to 25 mol % of units of the formula VII

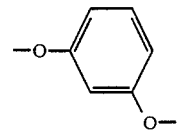

(c4) from 2 to 25 mol % of units of the formula VIII

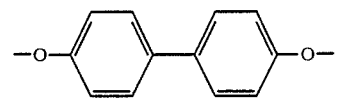

the total of the molar proportions of components (c1), (c2), (c3) and (c4) corresponding in each case to the total in mol % of components (a) and (b), (d) if desired from 5 to 25 mol % of repeat units of the formula IX

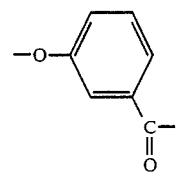

(e) repeat units of the formula X (Abstract continued on next page.)

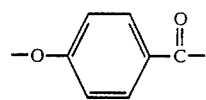
the molar proportions of (a), (b), (c), (d) and (e) in each case adding up to 100 mol %, the preparation thereof and fibers, films and molding prepared therefrom.
10 Claims, No Drawings

WHOLLY AROMATIC MESOMORPHIC POLYESTER IMIDES, THE PREPARATION AND USE THEREOF

The present invention relates to wholly aromatic mesomorphic polyester imides which form a liquid-crystal-line fiber-forming melt below 320° C.

Liquid-crystalline polyester imides are known. However, these polymers are in need of improvement in heat distortion resistance, processability and, in particular, abrasion resistance. U.S. Pat. No. 4,176,223 describes polyester imides which are based on naphthalenedicarboxylic acid, substituted hydroquinones and 4-(4'-carboxyphthalimido)benzoic acid. However, these polymers require temperatures of 330° C. or higher for processing from the melt. The same is true of the polyester imides described in U.S. Pat. No. 4,383,105, which are based on hydroxynaphthalenecarboxylic acid, terephthalic acid, p-hydroxybenzoic acid and 4-(4'-hydroxyphthalimido)phenol.

It is an object of the present invention to provide wholly aromatic mesomorphic polyester imides which form a liquid-crystalline fiber-forming melt below 320° C. and thus are easier to process and, what is more, have a high heat distortion resistance and abrasion resistance.

We have found that this object is achieved with wholly aromatic mesomorphic polyester imides which form a liquid-crystalline fiber-forming melt below 320° C. and are composed of (a) from 5 to 35 mol % of repeat units of the formulae I and/or II

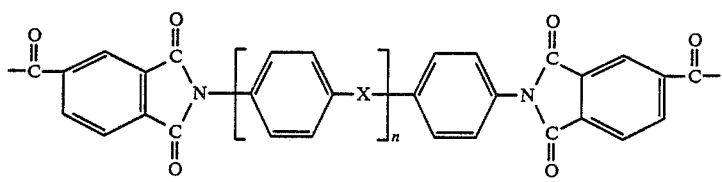

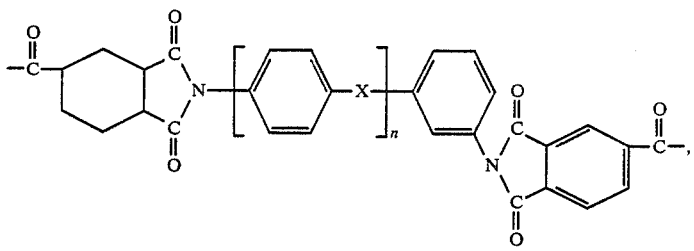

where the $X_s$ can be identical or different and each is —O—, —S—, —SO$_2$—, —CO—, —CH$_2$— or =C(CH$_3$)$_2$, and n is 0 or 1, (b) from 0 to 30 mol % of repeat units of the formula III and/or IV

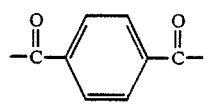

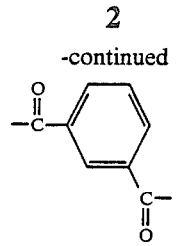

(c) a molar amount corresponding to the total amount of (a) and (b) of repeat units $C_1$ to $C_4$ (C1) from 3 to 35 mol % of units of the formula V

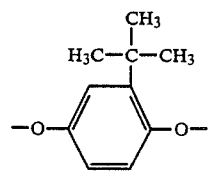

and one or more of the repeat units of the formulae VI, VII and VIII (c2) from 2 to 25 mol % of units of the formula

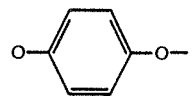

(c3) from 0 to 25 mol % of units of the formula

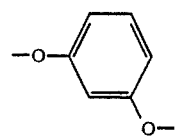

(c4) from 2 to 25 mol % of units of the formula

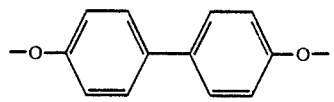

the total of the molar proportions of components (c1), (c2), (c3) and (c4) corresponding in each case to the total in mol % of components (a) and (b), (d) if desired from 5 to 25 mol % of repeat units of the formula IX

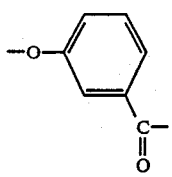

(e) repeat units of the formula X

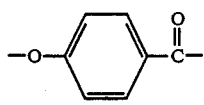

the molar proportions of (a), (b), (c), (d) and (e) in each case adding up to 100 mol %.

The novel wholly aromatic polyester imides have the advantage of combining a high heat distortion resistance with a smooth abrasion-resistant surface. The novel polyester imides also have high stiffness, strength and resilience. In addition, the novel polyester imides are substantially resistant to chemicals and of low flammability.

The liquid-crystalline state of the polyester imides can be detected with the polarization microscope using a method described in German Published Application DAS No. 2,520,819. Applied in a thickness of 10 μm between glass plates and viewed between crossed polarizers, the polymer melts have textures which can be ascribed to a mesomorphic phase.

The polyester imides according to the invention are composed of:

(a) from 5 to 35 mol %, in particular from 7 to 25 mol %, of repeat units of the formula I and/or II

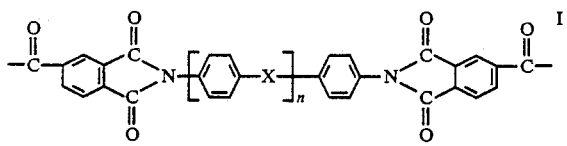

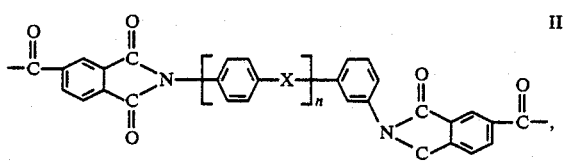

where the Xs can be identical or different and each is —O—, —S—, —SO$_2$—, —CO—, —CH$_2$— or =C(CH$_3$)$_2$, and n is 0 or 1.

Suitable starting compounds are for example
4,4'-bis-[(4-carboxy)-N-phthalimido]diphenyl ether,
4,4'-bis-[(4-carboxy)-N-phthalimido]diphenylmethane,
4,4'-bis-[(4-carboxy)-N-phthalimido]diphenyl sulfone,
4,4'-bis-[(4-carboxy)-N-phthalimido]diphenyl sulfide,
4,4'-bis-[(4-carboxy)-N-phthalimido]diphenyl ketone,
3,4'-bis-[(4-carboxy)-N-phthalimido]diphenyl ether,
3,4'-bis-[(4-carboxy)-N-phthalimido]diphenyl sulfide,
3,4'-bis-[(4-carboxy)-N-phthalimido]diphenyl sulfone,
3,4'-bis-[(4-carboxy)-N-phthalimido]diphenyl ketone,
3,4'-bis-[(4-carboxy)-N-phthalimido]diphenylmethane.

The preparation of such starting compounds is described for example in J. Polym. Sci. (A-1), 7, (1969), 321-332.

(b) From 0 to 30 mol %, in particular from 0 to 20 mol %, of repeat units of the formula III and/or IV

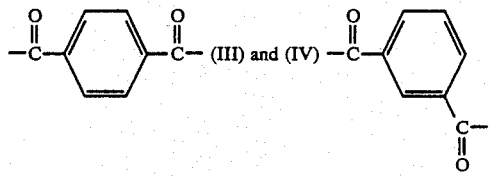

Suitable starting compounds are for example terephthalic acid and isophthalic acid.

(c) A molar amount corresponding to the total of components (a) and (b) of aromatic dihydroxy compounds, namely (c1) from 3 to 35 mol % of repeat units of the formula V

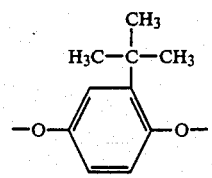

tert.-butylhydroquinone being an example of a suitable starting compound and one or more of the repeat units.

(c2) From 2 to 25 mol %

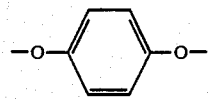

hydroquinone being an example of a suitable starting compound.

(c3) From 0 to 25 mol %

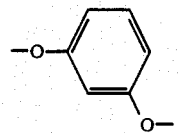

a preferred starting compound being for example resorcin.

(c4) From 2 to 25 mol %

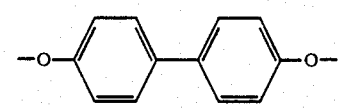

a suitable starting compound being for example 4,4'-dihydroxybiphenyl.

It will be readily understood that the total of the molar proportions of components (c1), (c2), (c3) and (c4) corresponds in each case to the total in mol % of components (a) and (b).

(d) If desired from 5 to 25 mol %, in particular from 5 to 20 mol %, of repeat units of the formula IX

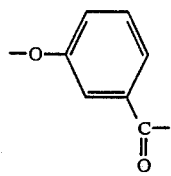

a suitable starting compound being for example m-hydroxybenzoic acid.

(e) Repeat units of the formula X, advantageously in a minimum amount of 10 mol %,

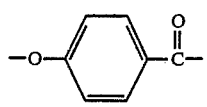

(X)

a suitable starting compound being for example p-hydroxybenzoic acid.

It will be readily understood that the molar proportions of components (a), (b), (c), (d) and (e) add up to 100 mol % in each case.

Advantageous polyester imides contain as component (c) from 5 to 25 mol % of repeat units of the formula V and one or more of the repeat units, namely from 5 to 20 mol % of repeat units of the formula VI, from 5 to 20 mol % of repeat units of the formula VII and from 5 to 20 mol % of repeat units of the formula VIII.

Preferred polyester imides contain as component (c) from 10 to 20 mol % of repeat units of the formula V, from 8 to 18 mol % of repeat units of the formula VI and from 5 to 16 mol % of repeat units of the formula VIII.

Other preferred polyester imides contain as component (c) from 10 to 20 mol % of repeat units of the formula V, from 8 to 18 mol % of repeat units of the formula VI and from 5 to 15 mol % of repeat units of the formula VII.

Preferred wholly aromatic polyester imides have a glass transition temperature Tg of $\geq 140°$ C., in particular $\geq 150°$ C. This glass transition temperature is to be measured by the DSC method as described by K. H. Illers et al. in Makromol. Chem. 127 (1969), 1 ff. The wholly aromatic liquid-crystalline polyester imides form a liquid-crystalline fiber-forming melt at below 320° C. Preference is also given to liquid-crystalline aromatic polyester imides which have partial crystallinity at a temperature $>200°$ C. and $<300°$ C.

The liquid-crystalline polyester imides according to the invention can be obtained in a manner similar to the techniques described for example in U.S. Pat. Nos. 4,375,530 and 4,118,372.

In an advantageous embodiment, the polyester imides according to the invention are obtained in a single-stage process by converting the underivatized starting materials using anhydrides of lower fatty acids, for example fatty acids of 2 to 4 carbon atoms, in particular acetic anhydride. This reaction may be catalyzed with the catalysts of the type described for example in EP-A-131,846, used in amounts of from 0.001 to 1% by weight, based on the starting materials. The starting materials are heated together with a fatty acid anhydride, advantageously present in a molar excess of not less 5%, based on the hydroxyl groups present, with stirring in an inert gas atmosphere to a temperature at which reflux occurs. Advantageously the temperature is increased in stages, for example in not more than 5 hours, preferably up to 2 hours, from 150° to 200° C., and subsequently the temperature is raised to 250°-350° C., for example in the course of 2-2.5 hours, while excess fatty acid anhydrides and fatty acids are distilled off. To complete the reaction, it has been found to be advantageous to employ reduced pressure, for example from 200 to 0.5 mbar, toward the end.

It is a remarkable and unforeseeable feature of this single-stage process that the desired polymers are obtained in a relatively short time in a troublefree and complete reaction without catalysts. This is all the more remarkable as the large number of chemically different hydroxyl groups would be expected to lead to differences in reactivity and hence to inadequate polymer synthesis.

The wholly aromatic liquid-crystalline polyester imides thus obtained can, following the condensation in the melt, be further condensed in the solid state, for example at 150°-250° C., until the desired viscosity is obtained. This postcondensation in solid phase can be carried out not only before but also after thermoplastic processing. Advantageously the solid phase condensation is carried out in the presence of inert gases such as nitrogen.

The polyester imides according to the invention can contain customary additives in active amounts. Suitable additives are stabilizers, oxidation inhibitors, agents against thermal decomposition and decomposition by ultraviolet light, lubricants, mold release agents, colorants such as dyes and pigments, and also fibrous or pulverulent fillers and reinforcing agents, nucleating agents or plasticizers.

The stabilizers can be added to the polymers at any stage of processing or when complete. Preferably the stabilizers are added early on to prevent onset of decomposition before the polymers are protected.

Suitable oxidation inhibitors and heat stabilizers are for example halides of metals of group I of the periodic table, for example sodium, potassium or lithium halides with copper(I) halides, for example chlorides, bromides or iodides, and also sterically hindered phenols, hydroquinones, various substituted representatives of these groups and combinations thereof. In general, these oxidation inhibitors and heat stabilizers are added in amounts of up to 1% by weight on the weight of the polymer.

Suitable UV stabilizers are for example various substituted resorcinols, salicylates, benzotriazoles and benzophenones. These UV stabilizers are generally used in amounts of up to 2% by weight, based on the polymer.

It is also possible to add organic dyes such as nigrosine and pigments, for example titanium dioxide, cadmium sulfide, cadmium sulfide selenide, phthalocyanines, ultramarine blue or carbon black, for example in amounts up to about 5% by weight.

Suitable pulverulent or fibrous fillers and reinforcing agents are for example carbon fibers, glass fibers, amorphous silica, asbestos, calcium silicate, aluminum silicate, magnesium carbonate, kaolin, chalk, quartz powder, mica or feldspar. Reinforcing agents and fillers are generally employed in amounts of up to 70% by weight, based on the polymer.

Suitable nucleating agents are for example talcum, calcium fluoride, sodium phenylphosphinate, aluminum oxide or finely divided tetrafluoroethylene.

Plasticizers which are employed in amounts of up to 20% by weight based on the polymer are for example dioctyl phthalate, dibenzyl phthalate, butyl benzyl phthalate, hydrocarbon oils, N-n-butylbenzenesulfonamide and o-and p-tolueneethylsulfonamide.

The wholly aromatic liquid-crystalline polyester imides according to the invention are suitable for preparing filaments, fibers, films, foams and industrial moldings by injection molding, pressing or extruding.

The moldings prepared from the polyester imides according to the invention have excellent mechanical properties such as stiffness, strength and resilience. They are also very resistant to chemicals and flame-retardant. In addition, they have a high heat distortion resistance and a smooth, abrasion-resistant surface. The polyester imides according to the invention are therefore highly suitable for preparing articles for electrical engineering, data processing, automotive construction and other industrial sectors. But they can also be used as coating materials (as pulverulent dispersions) or in the form of film.

The invention is illustrated by the following examples.

EXAMPLE 1

0.08 mol of terephthalic acid, 0.208 mol of 4-hydroxybenzoic acid, 0.056 mol of hydroquinone, 0.032 mol of dihydroxybiphenyl, 0.072 mol of t-butylhdroquinone, 0.08 mol of the compound

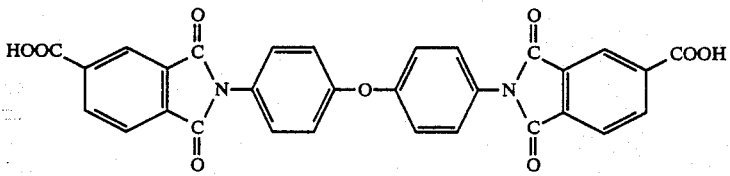

and 126 ml of acetic anhydride are heated with stirring under nitrogen from 150° C. to 300° C. in the course of 2 h 45 min, during which excess acetic anhydride and acetic acid is distilled off. The pressure is then reduced to 80 mbar in the course of 40 min to give a viscous fiber-forming melt. The polymer melt and the cooled polymer have a pearlescent luster. The polymer has a smooth, hard and abrasion-resistant surface. DSC measurement indicated a glass transition temperature of 156° C. The intrinsic viscosity is 1.21 dl/g, measured at 60° C. in 0.1% strength (wt./vol.) solution in pentafluorophenol.

EXAMPLE 2

0.08 mol of terephthalic acid, 0.208 mol of 4-hydroxybenzoic acid, 0.08 mol of hydroquinone, 0.08 mol of t-butylhydroquinone, 0.08 mol of the compound

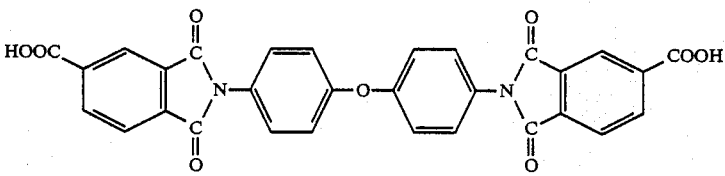

and 126 ml of acetic anhydride are heated with stirring under nitrogen from 150° C. to 300° C. in the course of 2 h 50 min, during which excess acetic anhydride and acetic acid is distilled off. The pressure is then reduced to 70 mbar in the course of 20 min to give a viscous fiber-forming melt. The polymer melt and the copolymer have a pearlescent luster. The polymer has a smooth, hard and abrasion-resistant surface. DSC measurements indicate a glass transition temperature of 159° C. The intrinsic viscosity is 0.93 dl/g, measured at 60° C. in 0.1% strength (wt./vol.) solution in pentafluorophenol.

We claim:

1. A wholly aromatic mesomorphic polyester imide which forms a liquid-crystalline fiber-forming melt below 320° C., composed of
   (a) from 5 to 35 mol % of repeat units of the formulae I and/or II

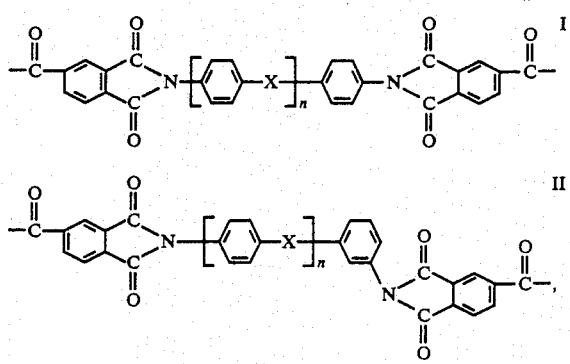

where x can be identical or different and each is —O—, —S—, —SO$_2$—, —CO—, —CH$_2$— or =C(CH$_3$)$_2$, and n is 0 or 1,
   (b) from 0 to 30 mol % of repeat units of the formulae III and/or IV

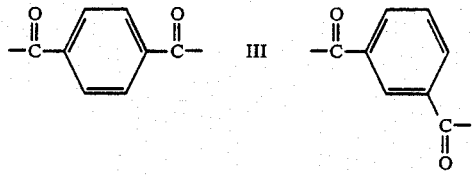

(c) a molar amount corresponding to the total amount of (a) and (b) of repeat units (c1) from 3 to 35 mol % of units of the formula V

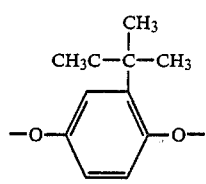

and one or more of the repeat units (c2) from 2 to 25 mol % of units of the formula VI

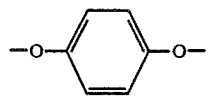

(c3) from 0 to 25 mol % of units of the formula VII

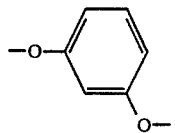

(c4) from 2 to 25 mol % of units of the formula VIII

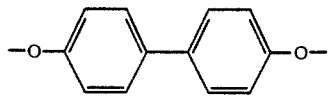

the total of the molar proportions of components (c1), (c2), (c3) and (c4) corresponding in each case to the total in mol % of components (a) and (b), (d) if desired from 5 to 25 mol % of repeat units of the formula IX

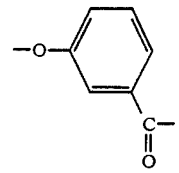

(e) repeat units of the formula X

-O-⟨benzene⟩-C(=O)- the molar proportions of components (a), (b), (c), (d) and (e) in each case adding up to 100 mol %.

2. A wholly aromatic mesomorphic polyester imide as claimed in claim 1, which contains from 7 to 25 mol % of repeat units of the formulae I and/or II, from 0 to 20 mol % of repeat units of the formulae III and/or IV, with or without from 5 to 20 mol % of repeat units of the formula IX.

3. A wholly aromatic mesomorphic polyester imide as claimed in claim 1, which contains as component C from 5 to 25 mol % of repeat units of the formula V and, in addition, one or more of the units from 5 to 20 mol % of the formula VI, from 5 to 20 mol % of the formula VII and from 5 to 20 mol % of the formula VIII.

4. A wholly aromatic mesomorphic polyester imide as claimed in claim 1, which contains as component C from 10 to 20 mol % of repeat units of the formula V and from 8 to 18 mol % of repeat units of the formula VI and/or from 5 to 16 mol % of repeat units of the formula VIII.

5. A wholly aromatic mesomorphic polyester imide as claimed in claim 1, which has a glass transition temperature Tg 140° C.

6. A process for preparing a wholly aromatic mesomorphic polyester imide as claimed in claim 1 by reacting the monomers in the form of the underivatized hydroxy and carboxy compounds in a single-stage process and in the described molar ratios with the addition of excess fatty acid anhydride at elevated temperature and distilling fatty acid anhydride and fatty acid out of the reaction mixture.

7. A process as claimed in claim 1, wherein after the condensation in the melt the wholly aromatic polyester imide is further condensed in solid phase at 150°–250° C.

8. A fiber from a polyester imide as claimed in claim 1.

9. A film from a polyester imide as claimed in claim 1.

10. A molding from a polyester imide as claimed in claim 1.

* * * * *